United States Patent [19]

Papuchon et al.

[11] Patent Number: 4,763,972
[45] Date of Patent: Aug. 16, 1988

[54] DIFFERENTIAL ABSORPTION POLARIZER, A METHOD OF FORMING SAME AND DEVICE IMPLEMENTING SAID METHOD

[75] Inventors: Michel Papuchon, Massy; Alain Enard, Montrouge; Sylvie Vatoux, St. Remy les Chevreuses; Michel Werner, Gif sur Yvette, all of France

[73] Assignee: Thomson-CSF, Paris, France

[21] Appl. No.: 910,980

[22] Filed: Sep. 24, 1986

[30] Foreign Application Priority Data

Sep. 27, 1985 [FR] France ................... 85 14375

[51] Int. Cl.$^4$ ............................................. G02B 6/12
[52] U.S. Cl. ............................. 350/96.11; 350/96.12; 350/96.13
[58] Field of Search ............... 350/96.11, 96.12, 96.13, 350/96.14

[56] References Cited

U.S. PATENT DOCUMENTS 3,918,136  11/1975  Ernsthausen .................... 445/24 X

OTHER PUBLICATIONS

C. Nguyen et al.; "Experimental Studies of Metal-Clad Tapered Optical Waveguides"; Electronic Letters; May 24, 1984; vol. 20, No. 11, p. 439.
Optical Communication, ECOC '84, Tenth European Conference on Optical Communication, Stuttgart, 3-6 Sep. 1984, edited H. Haupt, pp. 44-45, North-Holland, Amsterdam, NL; J. Ctyroky et al., "Thin-Film Polarizer for Optical ... ".
Optics Letters, vol. 10, No. 6, Jun. 1985, pp. 288-290, Optical Society of America, New York, US; K. Thyagarajan et al., "Experimental Demonstration of TM Mode-Attenuation Resonance in Planar Metal--Clad Optical Waveguides".
Journal of Lightwave Technology, vol. LT-2, No. 4, Aug. 1985, pp. 528-530, IEEE, New York, US; B. Zhang et al., "C2F6 Reactive Ionbeam Etching of LiNbO3 & Nb2O5 and their Application to Optical Waveguides".
Applied Optics, vol. 23, No. 17, Sep. 1984, pp. 2985-2987, R. F. Carson et al, "Polarization Effects in Silicon-Clad Optical Waveguides."

Primary Examiner—John Lee
Assistant Examiner—John Ngo
Attorney, Agent, or Firm—Oblon, Fisher, Spivak, McClelland & Maier

[57] ABSTRACT

A differential absorption polarizer is constructed to be used in accordance with integrated optics.

This polarizer includes, on a waveguide layer formed on a substrate, a layer of dielectric material whose surface has hollows and bosses and therefore several inclined zones. The hollows and bosses define minimum (em) and maximum (eM) thicknesses of the layer, which bracket the resonance thickness of the dielectric for the polarization there to be absorbed.

The dielectric material layer is coated with a metal layer.

18 Claims, 4 Drawing Sheets

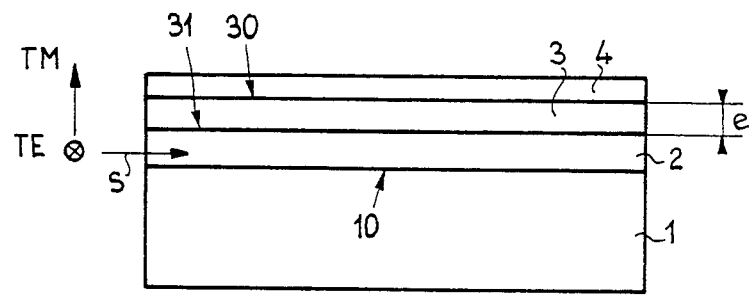
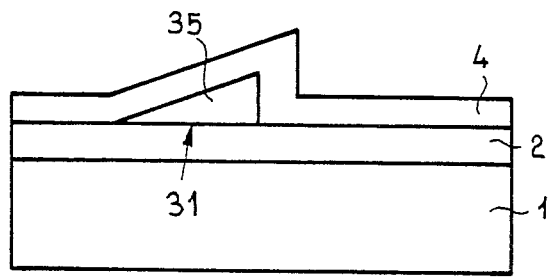
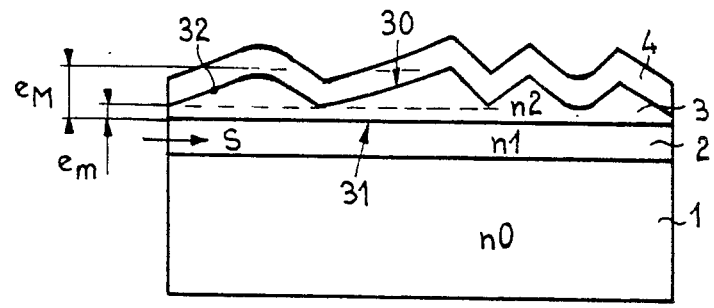

FIG_4
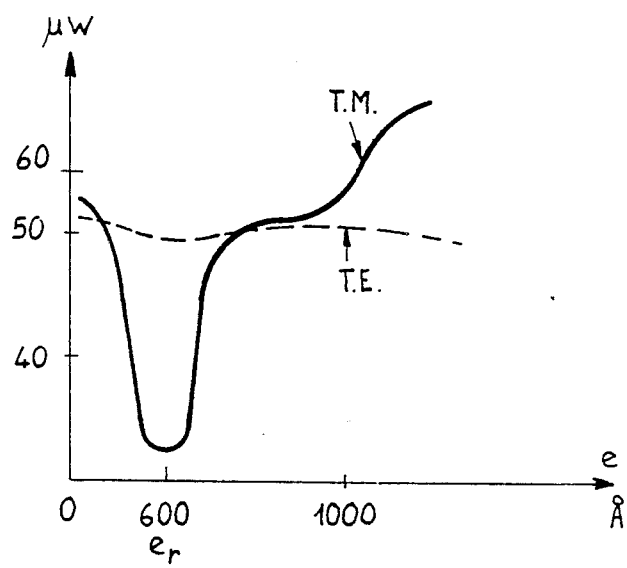
FIG_5
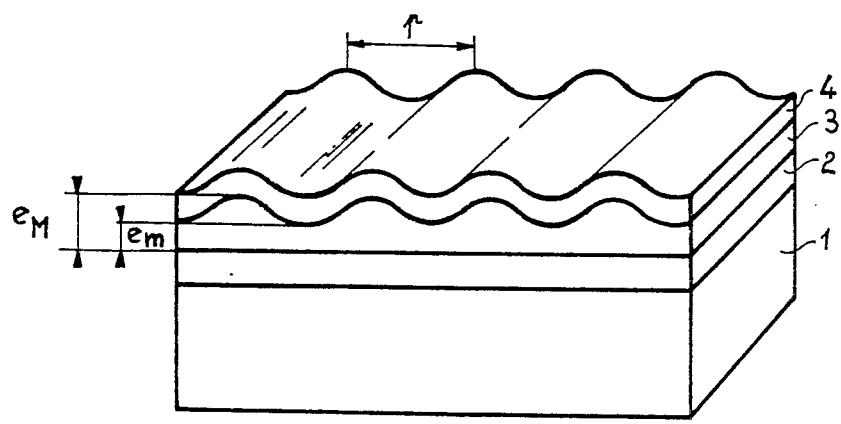

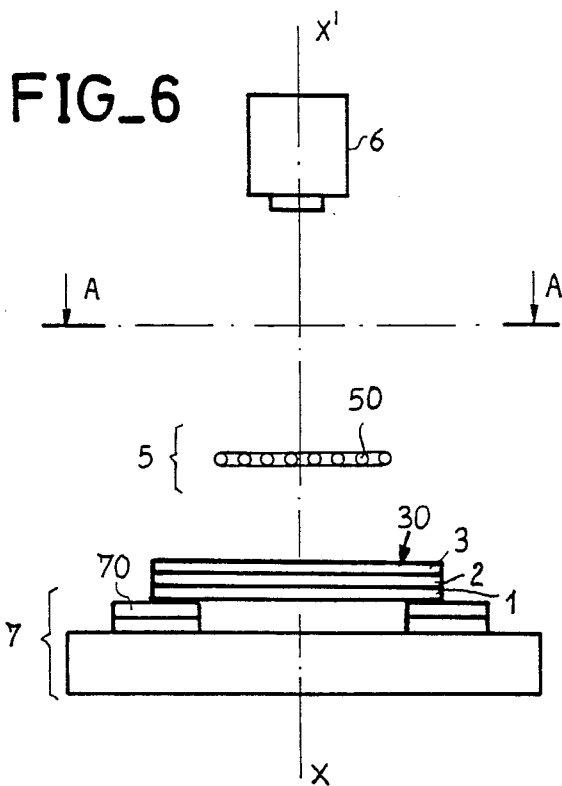
FIG_6
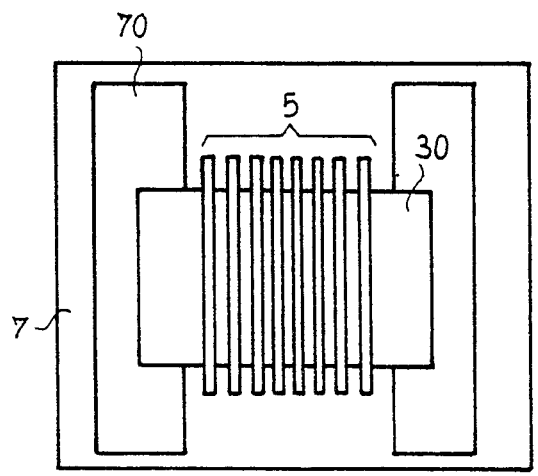
FIG_7

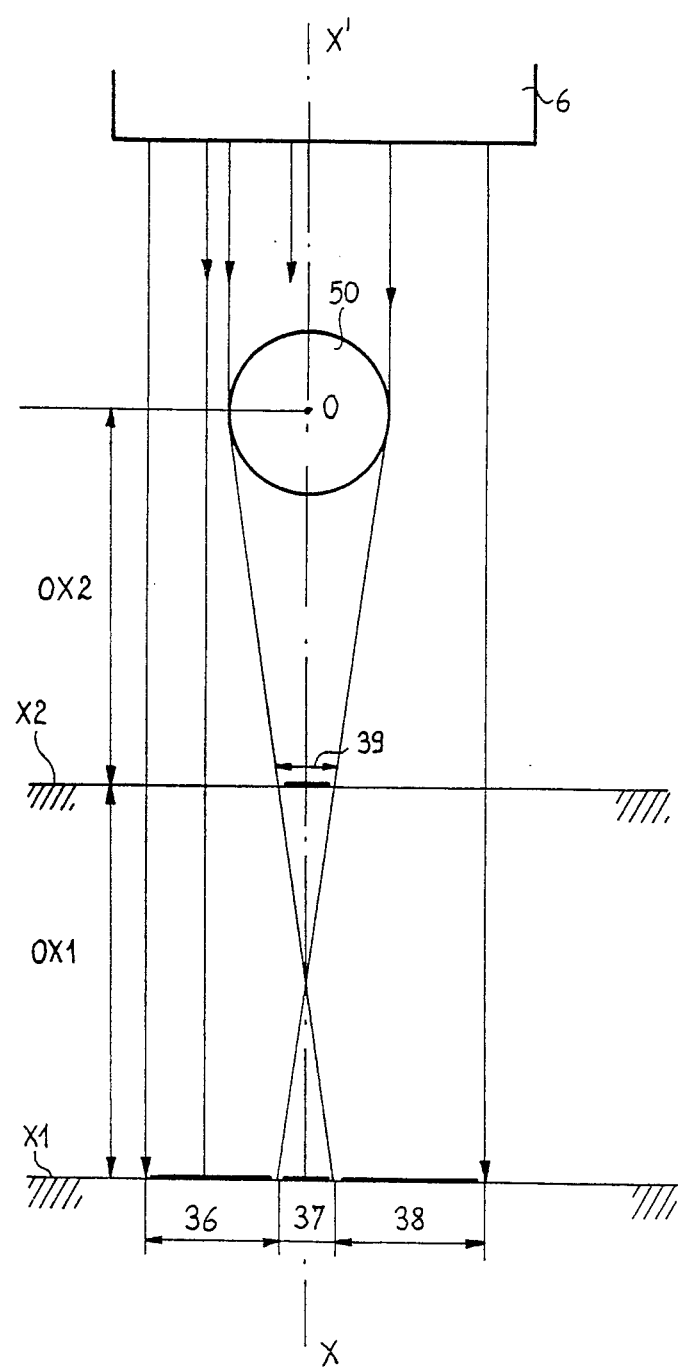
FIG_8

DIFFERENTIAL ABSORPTION POLARIZER, A METHOD OF FORMING SAME AND DEVICE IMPLEMENTING SAID METHOD

BACKGROUND OF THE INVENTION

The invention relates to a differential absorption polarizer more particularly for forming an integrated optics polarizer. It also relates to the method of forming such a polarizer and an apparatus implementing this method.

Several techniques have been proposed and experimentally verified for forming an integrated optics polarizer element. In brief, they may be grouped into two categories:

Elimination of one of the transverse electric TE or transverse magnetic TM polarizations by differential absorption;

Spacial separation of the two polarizations, one remaining guided and the other being placed at the cut-off.

In general, the second type of polarizer leads to complex configurations some of which are not always compatible with the planar geometry of the integrated optics. Thus, there may be mentioned as example the use at the surface of the waveguide of an anisotropic crystal one of whose refraction indexes would be, for one of the optical polarizations higher than the refraction index of the waveguide. A description of such a system will be found in the article "ANISOTROPIC POLARIZERS FOR Ti:LiNb03 STRIP WAVEGUIDES" by M. PAPUCHON et al published in the Technical Digest on the 24th-26th Apr. 1984 (KISSIMMEE, Fla. 7th topical meeting INTEGRATED AND GUIDED-WAVE OPTICS-WC5). In other cases, the anisotropic properties of the substrate itself may be used (eg: LiN03) for obtaining the desired effect in situ. It can in fact be shown that, in the case of LiNb03, if the optical axis is in the plane of the substrate for some angles, of the waveguides with this optical axis, the propagation of "quasi TE" waves takes place with the losses which may be very high (>50dB over 10 mm demonstrated in the laboratory). This configuration may form a disadvantage during integration of other functions with particular characteristics.

The invention uses then the elimination of one of the transverse magnetic TM or transverse electric TE polarizations by differential absorption.

Polarizers using this effect are known in the technique.

In these polarizers, polarization effect is obtained by creating a differential absorption between the quasi TE and quasi TM polarized modes because of the high attenuation which may be induced in the TM wave using a metal layer. To increase the efficiency of the interaction, a dielectric buffer layer must be inserted between the metal and the waveguide. The optogeometric parameters of this layer generally depend critically on the optical constants of the metal used. This is the case in particular for the thickness of the dielectric buffer layer which must be defined with high accuracy (about 100 Å). The article by K. THYAGARAJAN et al having for title "EXPERIMENTAL DEMONSTRATION OF TM MODE-ATTENUATION RESONANCE IN PLANAR METAL-CLAD OPTICAL WAVEGUIDES" published in Optics Letters volume 10, number 6, in June 1985, pages 288 to 290, demonstrates the importance of the thickness of the dielectric buffer layer for obtaining efficient polarization. This particular thickness is in general difficult to obtain.

To try to overcome this drawback, a known arrangement consists in bevelling the dielectric buffer layer as is described in the article "EXPERIMENT STUDIES OF METAL-CLAD TAPERED OPTICAL WAVEGUIDES" by C. NGUYEN et al published in Electronic Letters of the 24th of May 1984, volume 20, number 11, p. 439.

Thus, the mode to be absorbed, will find in the bevelled thickness of the dielectric layer a thickness adapted to better absorption.

However, such a bevelled structure is difficult to obtain and, in addition, does not always allow a good efficiency to be obtained.

This is why the invention provides a polarizer easy to construct and allowing efficient polarization to be obtained.

SUMMARY OF THE INVENTION

The invention relates then to a differential aborption polarizer constructed in integrated optics, comprising:

a substrate of a first index having on one face a first layer of a guide material of a second index for guiding at least a transverse magnetic TM polarization of a wave S;

a second layer of a dielectric material of a third index whose face opposite the common face with the first guide material layer has several zones inclined with a respect to the plane of the face, for each of said inclined zones, the value of the smallest thickness of the dielectric material and the value of the highest thickness of the same dielectric material bracketing the value of the resonance thickness of the dielectric material for said transverse magnetic TM polarization mode;

a third layer of a metal material deposited on the face of the dielectric layer having inclined zones.

The invention also relates to a method of constructing the differential absorption polarizer comprising a first phase of depositing on a substrate, a layer of a guide material for guiding a transverse magnetic polarization mode of a wave, a second phase of depositing on the guide material layer, a lyaer of a dielectric material, a third phase of depositing on the dielectric material layer a metal material layer, comprising between said second and third phases an additional phase for forming a plurality of zones inclined with respect to the dielectric material layer.

Finally the invention also relates to a device for ionic etching of said dielectric layer comprising an ion gun emitting an ion beam towards said face of the dielectric layer, comprising a grid inserted between the ion gun and said face of the dielectric layer.

BRIEF DESCRIPTION OF THE DRAWINGS

The different objects and characteristics of the invention will be related in detail in the following description given by way of example, with reference to the accompanying figures which show:

FIG. 1, a polarizer of the prior art having a dielectric buffer layer of uniform thickness;

FIG. 2, a polarizer of the prior art having a dielectric bevelled shaped layer;

FIG. 3, one embodiment of a polarizer of the invention;

FIG. 4, a transmission curve illustrating the absorption operation of a polarizer for different thicknesses of the dielectric buffer layer;

FIG. 5, an example of a variant of construction of a polarizer according to the invention;

FIG. 6, an example of construction of an apparatus implementing the method of the invention;

FIG. 7, a sectional view through AA of FIG. 6;

FIG. 8, a detailed diagram showing the role of each wire of the masking grid of the apparatus of FIGS. 6 and 7.

DETAILED DESCRIPTION OF THE INVENTION

Referring to FIG. 1, a polarizer of a type known in the technique, will first of all be described.

This polarizer has, on a face 10 of a substrate, a layer 2, of a guide material. This layer is injected by means not shown and which are outside the scope of the invention, a light wave S having transverse electric (TE) and transverse magnetic (TM) polarization modes. These polarization modes are orthogonal and are shown at the left of FIG. 1. Layer 2 is coated with a dielectric buffer layer 3 which is coated on its face 30 with a metal layer 4.

The refraction index n1 of the guide material of the layer 2 is higher than the refraction index n0 of the substrate and higher than the refraction index n2 of the dielectric layer 3:

$$n1 > n0 > n2$$

Therefore a light wave is guided in the guide layer 2.

In the technique, it is known that, depending on the value of the refraction index n2 of dielectric 3 and for a given thickness e of layer 3, the transverse magnetic TM component of wave S is partially absorbed. The absorption is all the more efficient the closer the thickness e of layer 3 is to a thickness er called resonance thickness.

This resonance thickness, so as to lead to good absorption, must be obtained very accurately with constructional tolerances difficult to comply with. This is why, instead of having a constant thickness of layer 3, a dielectric material element 35 is provided having a face inclined with respect to the face 31 in contact with the wave guide layer 2. The dimensions of element 35 are such that, considering its index of refraction n2, its maximum thickness is slightly greater that the resonance thickness er.

During transmission of the wave, the transverse magnetic component will be absorbed with maximum absorption in the section of elements 35 corresponding to this resonance thickness.

However, such an element 35 does not always provide sufficient absorption efficiency and the invention provides a polarizer easy to construct and giving rise to an appreciable improvement of the efficiency of the absorption and so to a more efficient polarizer.

Referring to FIG. 3, one embodiment of the polarizer in accordance with the invention will now be described.

Like the polarizers described above with reference to FIGS. 1 to 2, the polarizer of the invention comprises, on a substrate 1 of refraction index n0, a layer of guide material 2 of index n1.

In accordance with the invention, the polarizer of FIG. 3 has a layer 3 of a dielectric material a face 31 of which is common with the guide material layer 2 and the opposite face 30 has a plurality of zones slanting with respect to zone 32. Face 30 has then an uneven trend which gives to the cross section of the polarizer, in the propagation direction of a wave S, a profile having several successive inclined zones.

The undulations obtained are such that the minimum thickness em existing between a hollow of face 30 and the opposite face 31, and the maximum thickness eM existing between a boss on face 30 and the opposite face 31, bracket the value of the resonance thickness er:

$$em < er < eM$$

Each inclined zone 32 defines then a volume of dielectric material, between this zone 32 and face 31 of a variable thickness, bracketting the resonance er of the material.

Face 31 is then metallized by a layer 4 as before.

A wave S propagating in the waveguide layer 2 will have its transverse magnetic component likely to be absorbed several times, that is to say at each passage on an inclined zone such as 32 of the dielectric layer 3.

In fact, the curves of FIG. 4 show that, for a thickness e of the dielectric layer 3, the transmission of the transverse magnetic component TM is minimum and its absorption is therefore maximum. On the other hand, the transmission of the transverse electric component is not affected and undergoes no absorption.

Therefore, the polarizer of the invention provides improved efficiency with respect to the polarizer of known type.

In FIG. 3, the surface 30 of the electric material layer 30 is uneven. However, in anothr embodiment, it may have the appearance of an even undulation having a constant pitch p, even a sinusoidal undulation, defining minimum em and maximum eM thicknesses of the layer 3 corresponding to the condition:

$$em < er < eM$$

By way of example, layer 2 may be made from a crystalline material of the LiNbO3 type of a thickness from 2.5 to 3 μm. The dielectric material layer 3 may be an Yttrium oxide of refraction index n2=1.85. For this refraction index, the resonance thickness is about er=929 Å.

To construct such a polarizer, the invention provides a method comprising the following phases:

deposition on substrate 1 of an LiNbO3 guide layer 2, by any process known in the technique such as vapor phase heteroepitaxy or epitaxial growth or doping with an adequate metal ion such as titanium;

deposition of a layer of an organometalic liquid containing for example titanium or silicon or a proportion of these two materials ;

heating by evaporation and oxygenation of the liquid layer so as to obtain an oxide layer 3;

forming the inclined zone 32 in layer 3;

deposition on layer 3 of a metal layer 4 by projection or evaporation for example.

Layer 3 may be formed into inclined zones 32 by die stamping of the surface 30 after preliminary heating of the liquid layer and before complete hardening of this layer.

The forming may also take place after hardening of layer 3, by ionic shaping.

The method of the invention providing ionic shaping of layer 3 may be put into practice by the apparatus of the invention shown in FIGS. 6 and 7.

This apparatus comprises a frame 7 for supporting the element to be treated. This frame is disposed along an axis XX'. The element to be treated rests on frame 7 through spacers 70 so that face 30 of the element to be treated is substantially perpendicular to the axis XX'.

An ion gun disposed along this axis XX' directs a beam of ions towards the face 30 of layer 3 of the elmenet to be treated.

In addition, a masking grid 5 formed of wires 50 made from a material such as tungsten is deposited between the ion gun and the element to be treated, in the path of the ion beam.

Thus, as shown in FIG. 8 a wire 50 placed in the ion beam diffracts this beam and causes, a higher or lower degree of etching at a given distance OX1 from the grid on the surface 30 of layer 3. Thus, in zone 37 different forming will be obtained than in zone 36 and 38 and a formed surface of a substantially sinusoidal trend is obtained with grid 5.

If surface 30 is placed closer to grid 5, at a distance OX2 from wire 50, a shadow zone (39) is observed in which the surface is not etched.

By way of example, a polarizer has been formed having a surface 30 with a sinusoidal shaped undulation by means of an ionic implanter 6 operating at a high voltage of 1,000 volts and providing an ionic density of 0.5 mA/cm$^2$ with a pressure on the ionic source of $5 \times 10^{-4}$T using Argon as gas.

The distance OX1 between the surface 30 of layer 3 and a masking grid 5 has been taken equal to 16 cm.

The grid used was formed of rectilinear and parallel tungsten wires of a diameter of 0.1 mm disposed at a pitch of 0.4 mm.

The organometalic liquid used included two volumes of titanium based liquid for 1 volume of silicon based liquid.

With a forming time of 3 minutes, a substantially sinusoidal etching was obtained under these operating conditions whose peak to peak depth was about 500 Angstroems.

These numerical examples are only given by way of example and other constructions may be envisaged in other operating conditions.

What is claimed is:

1. A differential absorption polarizer constructed in integrated optics, comprising:

a substrate of a first index having on one face a first layer of a guide material of a second index, for guiding at least one transverse magnetic TM polarization of a wave S;

a second layer of a dielectric material of a third index whose face opposite the common face with the first guide material has several zones inclined with respect to the plane of the face, for each of said inclined zones, the value of the lowest thickness (em) of the dielectric material and the value of the highest thickness (eM) of the same dielectric material bracketing the value of the resonance thickness (er) of the dielectric material for said transverse magnetic TM polarization mode and wherein said inclined zones form an irregular surface;

a third layer of a metal material deposited on the face of the dielectric layer having inclined zones.

2. The absorption polarizer as claimed in claim 1, wherein the inclined zones have substantially the same slope and the same shape.

3. The absorption polarizer as claimed in claim 1, wherein the inclined zones have a regular pitch (p) at the surface of the dielectric.

4. The absorption polarizer as claimed in claim 1, wherein the inclined zones form an undulating surface on the dielectric material layer.

5. The absorption polarizer as claimed in claim 4, wherein the undulating surface has a generaly sinusoidal shape.

6. The absorption polarizer as claimed in claim 1, wherein the dielectric material layer comprises an oxide.

7. The absorption polarizer as claimed in claim 6, wherein said oxide is a mixture of silica and titanium oxide.

8. A method of constructing a differential absorption polarizer as claimed in claim 1, including a first phase of depositing on a substrate a layer of a guide material for guiding a transverse magnetic polarization mode (TM) of a wave, a second phase of depositing on the guide material layer a layer of a dielectric material, a third phase of depositing on the dielectric material layer a layer of a metal material, further comprising, between said second and third phases, an additional phase for forming a plurality of inclined zones at the surface of the dielectric material layer so as to have an irregular surface.

9. The method of constructing a polarizer as claimed in claim 8, wherein the second phase of depositing a layer of a dielectric material comprises a step of depositing a layer of an organometallic liquid followed by an evaporation and oxidation step by heating said liquid layer.

10. The method of constructing a polarizer as claimed in claim 9, wherein the additional forming phase comprises a stamping operation of said dielectric material layer after preliminary heating of the liquid layer and before complete hardening thereof.

11. The method for constructing a polarizer as claimed in claim 8, wherein the additional forming phase comprises an ionic shaping operation.

12. The method of constructing a polarizer as claimed in claim 11, wherein the ionic shaping operation takes place through a masking grid so that etching by the ions at the surface of the dielectric layer takes place non-uniformly.

13. The method of constructing a polarizer as claimed in claim 9, wherein the organometalic liquid comprises titanium.

14. The method of constructing a polarizer as claimed in claim 9, wherein the organometallic liquid comprises silicon.

15. The method of constructing a polarizer as claimed in claim 9, wherein the organometallic liquid comprises titanium and silicon.

16. A device for the ionic etching of said dielectric layer as claimed in claim 8, comprising an ion gun emitting a beam of ions towards said face of the dielectric layer, and further comprising a grid inserted between the ion gun and said face of the dielectric layer.

17. The ionic etching device according to claim 16, wherein said grid has a series of rectilinear wires disposed parallel in a plane substantially parallel to the plane of the face of the dielectric layer.

18. The ionic etching device as claimed in claim 17, wherein said wires are made from tungsten.

* * * * *